(12) United States Patent
Shim

(10) Patent No.: US 11,148,500 B2
(45) Date of Patent: Oct. 19, 2021

(54) SHOCK ABSORBER FOR VEHICLE

(71) Applicants: Hyundai Motor Company, Seoul (KR); Kia Motors Corporation, Seoul (KR)

(72) Inventor: Hyung Shik Shim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 16/570,111

(22) Filed: Sep. 13, 2019

(65) Prior Publication Data

US 2020/0353786 A1 Nov. 12, 2020

(30) Foreign Application Priority Data

May 7, 2019 (KR) .................. 10-2019-0053083

(51) Int. Cl.
*B60G 17/048* (2006.01)
*B60G 15/06* (2006.01)
*F16F 9/34* (2006.01)

(52) U.S. Cl.
CPC ......... *B60G 17/048* (2013.01); *B60G 15/063* (2013.01); *B60G 15/068* (2013.01); *B60G 2202/12* (2013.01); *B60G 2202/24* (2013.01); *B60G 2202/242* (2013.01); *B60G 2202/312* (2013.01); *B60G 2204/129* (2013.01); *B60G 2204/16* (2013.01); *B60G 2206/41* (2013.01); *F16F 9/34* (2013.01)

(58) Field of Classification Search
CPC .............. B60G 17/048; B60G 2202/31; B60G 17/0485; B60G 2206/41; F16F 9/36
See application file for complete search history.

(56) References Cited

U.S. PATENT DOCUMENTS

| | | | | |
|---|---|---|---|---|
| 4,256,292 A | * | 3/1981 | Sullivan, Jr. ......... | B60G 13/003 188/268 |
| 4,588,053 A | * | 5/1986 | Foster ..................... | F16F 9/512 137/513.3 |
| 6,776,269 B1 | * | 8/2004 | Schel ..................... | F16F 9/346 188/284 |
| 2006/0220918 A1 | | 10/2006 | Stockwell et al. | |

FOREIGN PATENT DOCUMENTS

| | | |
|---|---|---|
| JP | 2905504 B2 | 6/1999 |
| KR | 10-0391602 B1 | 7/2003 |
| KR | 10-0709511 B1 | 4/2007 |
| KR | 10-2009-0039479 A | 4/2009 |
| KR | 10-2016-0067654 A | 6/2016 |
| KR | 101724736 B1 | 4/2017 |

* cited by examiner

*Primary Examiner* — James A English
*Assistant Examiner* — Matthew D Lee
(74) *Attorney, Agent, or Firm* — Morgan, Lewis & Bockius LLP

(57) ABSTRACT

A shock absorber for a vehicle may include a flow path provided in a rod valve to allow an oil film to be formed between a cylinder and the rod valve during relative movements of a strut rod and the cylinder, and the oil film is used to prevent friction from occurring between the cylinder and the rod valve during steering.

12 Claims, 6 Drawing Sheets

SHOCK ABSORBER FOR VEHICLE

CROSS REFERENCE TO RELATED APPLICATION

The present application claims priority to Korean Patent Application No. 10-2019-0053083, filed May 7, 2019, the entire contents of which is incorporated herein for all purposes by this reference.

BACKGROUND OF THE INVENTION

Field of the Invention

The present invention generally relates to a shock absorber for a McPherson type suspension. More particularly, the present invention relates to a shock absorber for a vehicle, wherein an oil film is formed between a rod valve and a cylinder, whereby during steering, friction is prevented from occurring between the rod valve and the cylinder.

Description of Related Art

Generally, a suspension of a vehicle connects an axle with a vehicle body and does not allow vibration or impact transmitted from a road surface while driving to be directly transmitted to the vehicle body, preventing damage of the vehicle body or cargo and providing high riding comfort. A front suspension system may include an axle suspension type and an independent suspension type according to a type of a front axle.

Of these suspension types, the front suspension system of the independent suspension type is configured to be a structure in which divided axles are provided and opposite side wheels move independently of each other and accordingly, although the wheels are trapped in or hit an obstacle irrespective of left and right sides of the wheels, only the wheels contacting with the obstacle move upwards and downwards such that a vehicle body is not tilted. The front suspension system includes: a wishbone type suspension; a leaf spring type suspension having a leaf spring transversely provided to allow an upper suspension arm or a lower suspension arm to operate in cooperation with the spring; a trailing arm type suspension having the wheels supported by one or two arms rearward thereof; and a McPherson type suspension using a strut rod provided with a coil spring.

A shock absorber for a McPherson type suspension is configured to include: a cylinder configured to be connected with a steering knuckle; the strut rod provided in the cylinder such that an end portion thereof is inserted into the cylinder for the strut rod to move relatively to the cylinder; a rod valve combined on the strut rod; the coil spring; an insulator bush made of a rubber, and a bump stopper. Since the shock absorber for a McPherson type suspension is provided on a high position of a vehicle body, the shock absorber allows alignment to be set accurately and be changed little, widely distributing impact from a road surface.

Meanwhile, the McPherson type shock absorber is configured such that the cylinder is combined with the steering knuckle, and the strut rod including the rod valve is connected to and fixed on a vehicle body. Accordingly, when friction occurs between the cylinder and the rod valve, the cylinder does not efficiently rotate and thus steering responsiveness decreases. Particularly, during steering, a rotational force of the cylinder is transmitted to the strut rod by the rod valve and accordingly, the strut rod rotates with the cylinder, so that loosening of the strut rod occurs, and further, relative rotations of an insulator cup and the insulator bush therebetween occur, whereby durability decreases and friction noise occurs.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shock absorber for a vehicle, wherein a flow path is provided in a rod valve, and during bumping and rebounding of a strut rod, fluid flows through the flow path such that an oil film is formed between a cylinder and the rod valve, and during steering, friction is prevented from occurring between the cylinder and the rod valve due to the oil film.

Furthermore, due to the structure in which the oil film is used to prevent friction occurrence, the present invention allows the cylinder to efficiently rotate during steering, improving steering responsiveness. Particularly during steering, the present invention allows the strut rod to be prevented from rotating, whereby loosening of the strut rod is prevented, and furthermore, relative rotations of an insulator cup and an insulator bush are prevented and accordingly, durability is improved and friction noise is prevented from occurring.

In various aspects of the present invention, there is provided a shock absorber for a vehicle, the shock absorber including: a cylinder configured to be connected with a steering knuckle, and filled with fluid in the cylinder; a strut rod slidably mounted to the cylinder so that an end portion thereof is inserted into the cylinder; and a rod valve combined on the an end portion of the strut rod, the rod valve having a flow path guiding a flow of the fluid while the strut rod and the cylinder relatively move to each other, wherein the flow path is provided to be fluidically-connected to an external circumferential surface of the rod valve such that during the relative movements of the strut rod and the cylinder therebetween, an oil film is formed between the external circumferential surface of the rod valve and the internal wall surface of the cylinder.

The shock absorber may further include: an upper seal and a lower seal mounted on an external circumferential surface of the rod valve connected to an upper surface of the rod valve and on an external circumferential surface of the rod valve connected to a lower surface of the rod valve, respectively, wherein the upper seal and the lower seal may be provided to be in contact with an internal wall surface of the cylinder.

A diameter of the rod valve may be provided to be smaller than a diameter of the internal wall surface of the cylinder, so that a fluid space may be defined between the external circumferential surface of the rod valve, the internal wall surface of the cylinder, the upper seal, and the lower seal, wherein the fluid space may communicate with the flow path, and during the relative movements of the strut rod and the cylinder, the fluid may be discharged to the fluid space and accordingly, the oil film may be formed in the fluid space.

The flow path may include: a first flow path provided to communicate with the fluid space and to be formed through the upper surface of the rod valve; and a second flow path provided to communicate with the fluid space and to be formed through the lower surface of the rod valve.

The cylinder may be divided into an upper chamber and a lower chamber relative to the rod valve, wherein when the strut rod moves relatively toward a lower side of the cylinder, the fluid located in the lower chamber may be introduced into the second flow path and discharged to the fluid space to have the oil film formed in the fluid space, and flow through the first flow path to the upper chamber.

The cylinder may be divided into an upper chamber and a lower chamber, relative to the rod valve, wherein when the strut rod moves relatively toward an upper side of the cylinder, the fluid located in the upper chamber may be introduced into the first flow path and discharged to the fluid space to have the oil film formed in the fluid space, and flow through the second flow path to the lower chamber.

A valve groove having a cross section of a concave shape may be provided on the external circumferential surface of the rod valve along a circumferential direction of the rod valve to communicate with the fluid space.

The valve groove may be configured to be connected to the first flow path and the second flow path.

Furthermore, the shock absorber according to an exemplary embodiment of the present invention may include a rod valve combined on an end portion of a strut rod positioned in a cylinder; and a flow path provided on the rod valve, through which fluid flows, wherein since the flow path is provided to be fluidically-connected to an external circumferential surface of the rod valve, the fluid is discharged through the flow path to the external circumferential surface of the rod valve while the strut rod and the cylinder relatively move to each other, and an oil film is formed between the cylinder and the rod valve by the fluid discharged to the external circumferential surface of the rod valve.

The flow path may be configured to allow a cylinder space positioned on an upper side of the rod valve and a cylinder space positioned on a lower side of the rod valve relative to the rod valve to communicate with each other.

By use of the flow path provided on the rod valve, the shock absorber for a vehicle according to an exemplary embodiment of the present invention allows the oil film to be formed between the cylinder and the rod valve during the relative movements of the strut rod and the cylinder, and utilizes the oil film to prevent friction from occurring between the cylinder and the rod valve during steering. Accordingly, steering responsiveness is improved and loosening of the strut rod is prevented. Furthermore, relative rotations of an insulator cup and an insulator bush are prevented, whereby durability is improved and friction noise is prevented from occurring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
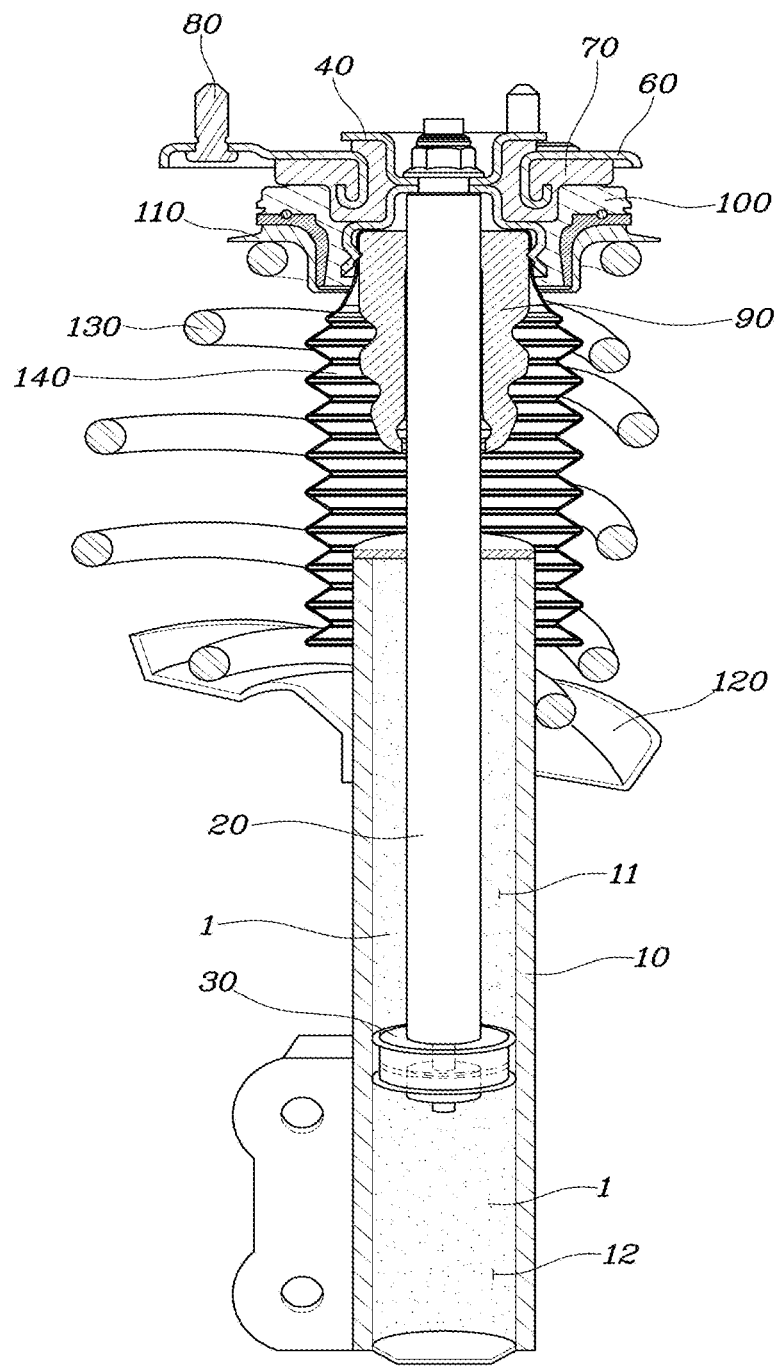
FIG. 1 is a cross-sectional view of a shock absorber for a vehicle having a rod valve provided with a flow path according to an exemplary embodiment of the present invention.
Figure 2:
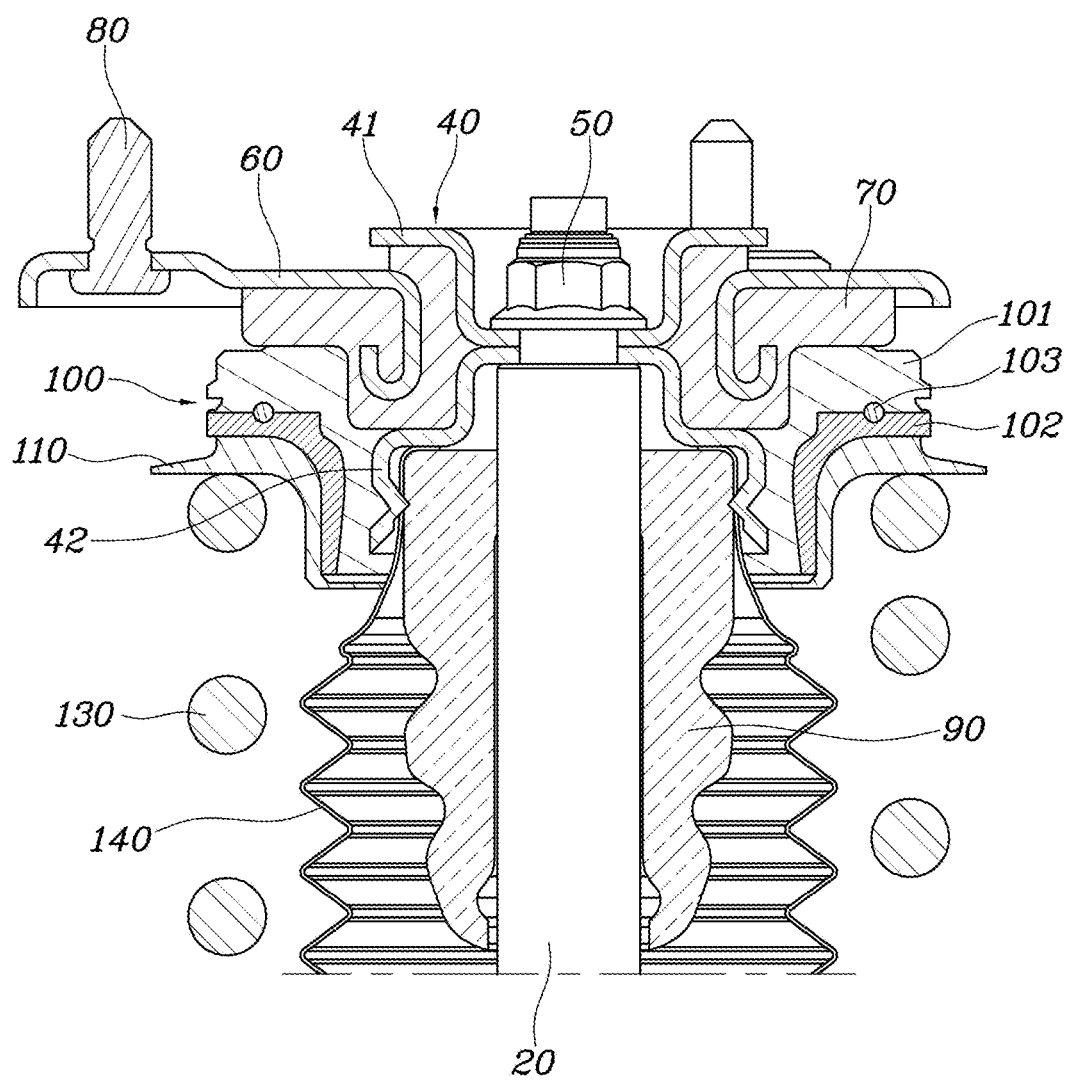
FIG. 2 is a cross-sectional view illustrated to describe configuration of an upper end portion of a strut rod in FIG. 1.
Figure 3:
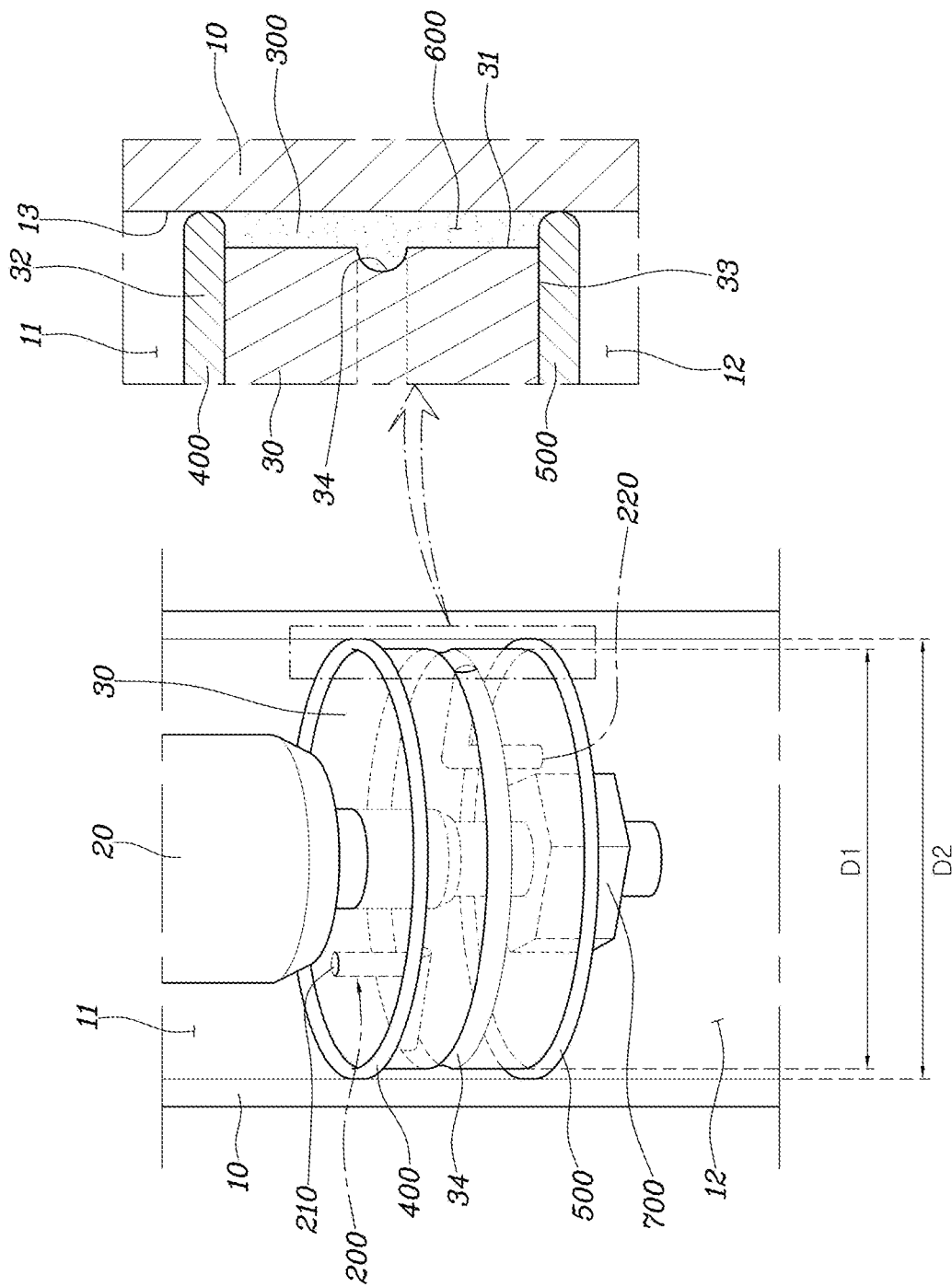
FIG. 3 is a perspective view illustrated to describe the rod valve provided with the flow path in FIG. 1.
Figure 4:
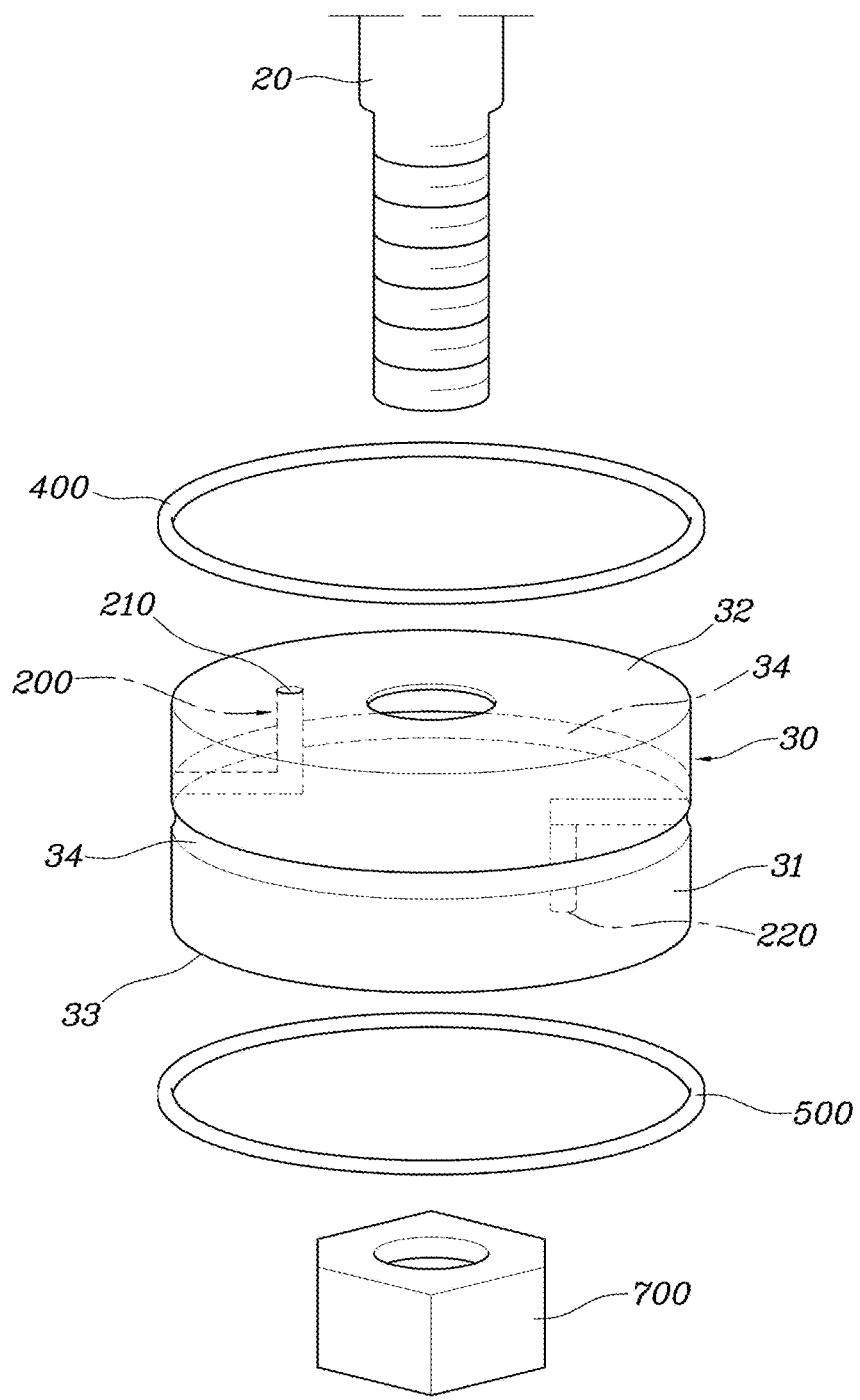
FIG. 4 is an exploded perspective view of the rod valve provided with the flow path, an upper seal, and a lower seal.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, a shock absorber for a vehicle according to an exemplary embodiment of the present invention will be described referring to the accompanying drawings.

As shown in FIG. 1, FIG. 2, FIG. 3, and FIG. 4, the McPherson type shock absorber according to an exemplary embodiment of the present invention includes a cylinder 10 connected with a steering knuckle, and filled with fluid 1 therein; a strut rod 20, a first side of which is inserted into the cylinder 10 and a second side of which protrudes from an upper side of the cylinder 10; and a rod valve 30 combined on the first side of the strut rod 20 positioned in the cylinder 10.

An internal space of the cylinder 10 includes an upper chamber 11 and a lower chamber 12 relative to the rod valve 30 and is configured such that the upper chamber 11 and the lower chamber 12 are filled with the fluid 1.

An upper end portion of the strut rod 20 protruding from the upper side of the cylinder 10 passes through an insulator cup 40 and is engaged with a nut 50, and the insulator cup 40 is combined with an insulator bush 70, which is made of a rubber, having an upper plate 60 to form a module, wherein the upper plate 60 has a structure in which a plurality of bolts 80 are used for the upper plate to be combined on a vehicle body.

The insulator cup 40 includes an upper cup 41 and a lower cup 42, wherein the upper cup 41 is a plate on which the upper end portion of the strut rod 20 is combined by the nut 50, and the lower cup 42 is a plate regulating a position of a bump stopper 90.

A bearing 100 is positioned at a lower side of the insulator bush 70, wherein a spring upper seat 110 is positioned at a lower side of the bearing 100; a spring lower seat 120 is combined on the cylinder 10; and opposite end portions of a coil spring 130 are supported by the spring upper seat 110 and the spring lower seat 120.

The bearing 100 is configured to include an upper race 101, a lower race 102, and a plurality of balls 103 provided between the upper race 101 and the lower race 102, wherein the upper race 101 is combined with the insulator bush 70, and the lower race 102 is combined with the spring upper seat 110.

A reference number 140, which is not described, refers to a dust cover.

Accordingly, during steering by a driver, the cylinder 10, the spring lower seat 120, the coil spring 130, the spring upper seat 110, and the lower race 102 of the bearing 100 are parts rotating with the knuckle, and the remaining parts such as the rod valve 30, the strut rod 20, the bump stopper 90, the insulator cup 40, the insulator bush 70, and the upper plate 60 are fixed parts connected to a vehicle body not to rotate.

Meanwhile, according to the exemplary embodiment of the present invention, the shock absorber is configured such that the fluid 1 filled in the cylinder 10 is used for friction to be prevented from occurring between the rotating cylinder 10 and the rod valve 30 during steering.

That is, a flow path 200 guiding a flow of the fluid 1 is provided on the rod valve 30 during movements of the strut rod 20 and the cylinder 10, wherein the flow path 200 is provided to be connected to an external circumferential surface 31 of the rod valve 30. Accordingly, during the relative movements of the strut rod 20 and the cylinder 10, the fluid 1 is discharged through the flow path 200 to an external side of the rod valve 30, whereby an oil film 300 is provided by the fluid 1 discharged to a space positioned between the external circumferential surface 31 of the rod valve 30 and an internal wall surface 13 of the cylinder 10.

Meanwhile, the McPherson type shock absorber is configured such that the cylinder 10 is combined with the steering knuckle, and the strut rod 20 including the rod valve 30 is connected to and fixed on a vehicle body. During vehicle movement, tires and wheels, and the cylinder 10 combined with the knuckle move upwards and downwards, and the strut rod 20 including the rod valve 30 does not move upwards and downwards. Accordingly, the shock absorber is configured to allow the relative movements of the strut rod and the cylinder 10 to be performed in upward and downward directions thereof.

According to an exemplary embodiment of the present invention, an upper seal 400 and a lower seal 500 are combined on an external circumferential surface 31 of the rod valve connected to an upper surface 32 of the rod valve 30 and on an external circumferential surface 31 of the rod valve connected to a lower surface 33 of the rod valve, respectively.

The upper seal 400 and the lower seal 500 can be made of rubber or elastomer such as Teflon and the like and are provided to be in contact with the internal wall surface 13 of the cylinder 10, maintaining airtightness.

A diameter D1 of the rod valve 30 is provided to be smaller than a diameter D2 of the internal wall surface 13 of the cylinder 10. Accordingly, the fluid space 600 of a predetermined size is provided between the external circumferential surface 31 of the rod valve 30, the internal wall surface 13 of the cylinder 10, the upper seal 400, and the lower seal 500.

The fluid space 600 is configured to communicate with the flow path 200. Accordingly, during the relative movements of the strut rod 20 and the cylinder 10, the fluid 1 is discharged to the fluid space 600 and thus the oil film 300 is formed in the fluid space 600, whereby during steering, friction may be prevented from occurring between the cylinder 10 and the rod valve 30 by the provided oil film 300.

The flow path 200 according to an exemplary embodiment of the present invention includes a first flow path 210 provided to communicate with the fluid space 600 and to be formed through the upper surface 32 of the rod valve 30; and a second flow path 220 provided to communicate with the fluid space 600 and to be formed through the lower surface 33 of the rod valve 30.

A reference number 700, which is not described, refers to the nut screwed to a lower end portion of the strut rod 20 passing through the rod valve 30.

The shock absorber reduces impact and noise transmitted to a vehicle body while the strut rod is continuously bumping and rebounding while driving.

Figure 5:
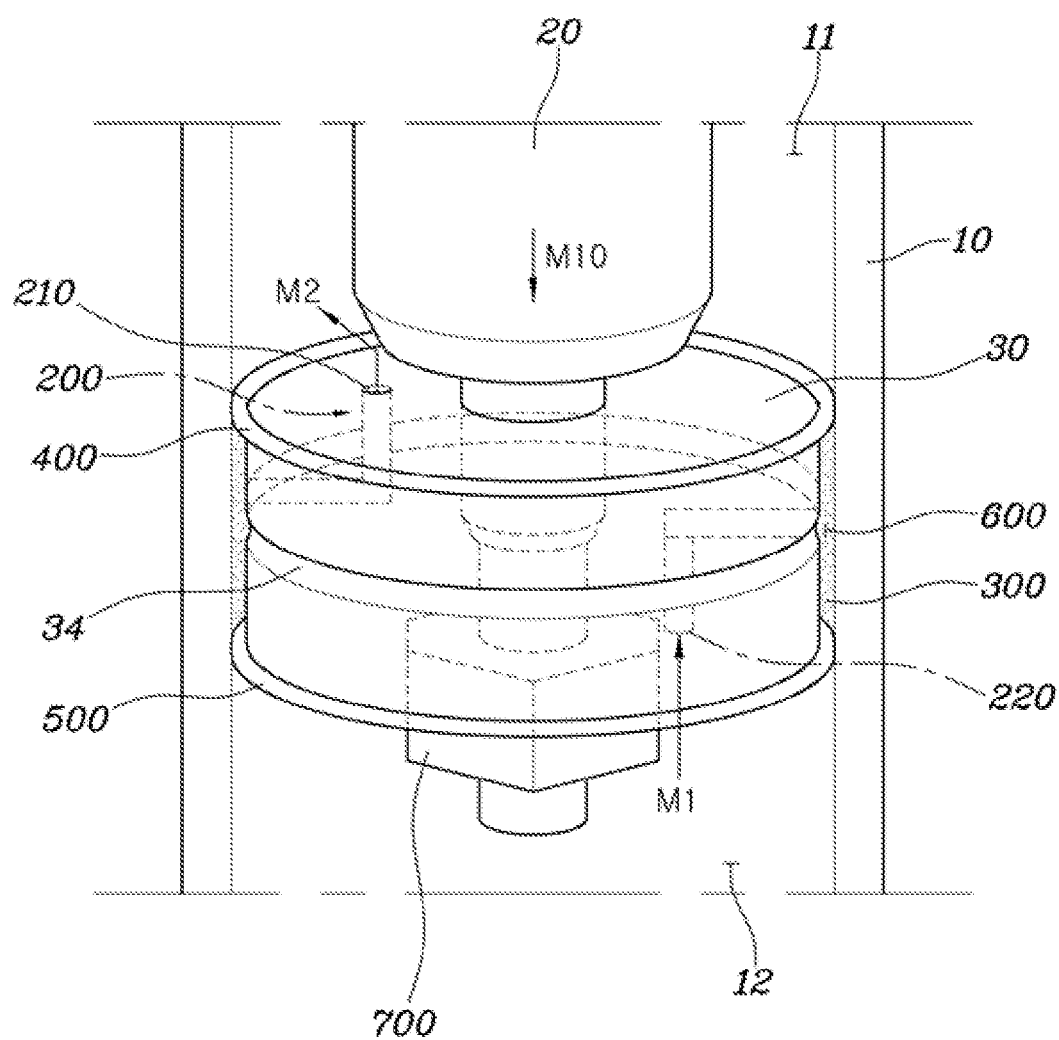
FIG. 5 and FIG. 6 are perspective views illustrated to describe operation states occurring during bumping and rebounding of the strut rod.

When the bumping occurs, as shown in FIG. 5, the strut rod 20 relatively moves toward a lower side of the cylinder 10 (an arrow M10), and in the instant case, as an arrow M1 shows, the fluid 1 located in the lower chamber 12 of the cylinder 10 is introduced into the second flow path 220 and is discharged to the fluid space 600.

Due to the fluid 1 discharged to the fluid space 600, the oil film 300 is formed in the fluid space 600, and accordingly, friction may be prevented from occurring between the cylinder 10 and the rod valve 30 by the oil film 300 formed in the fluid space 600.

The fluid 1 introduced into the second flow path 220 finally flows through the first flow path 210 to the upper chamber 11 of the cylinder 10 (an arrow M2), and accordingly, the flow path 200 may perform a function of an orifice of an existing valve, whereby the shock absorber may continuously have a sufficient damping effect.

Accordingly, although the cylinder 10 rotates in cooperation with the steering knuckle during steering, friction may be prevented from occurring between the cylinder 10 and the rod valve 30 due to the oil film 300 formed between the cylinder 10 and the rod valve 30. Accordingly, the rod valve 30 and the strut rod 20 may be prevented from rotating with the cylinder 10, whereby an efficient rotation of the cylinder 10 may be achieved and steering responsiveness may be improved.

Furthermore, due to a structure in which the oil film 300 is used to prevent friction occurrence, the present invention allows a rotation of the strut rod 20 to be prevented during steering. Accordingly, loosening of the nut 50 screwed to the strut rod 20 may be prevented, and particularly, the relative rotations of the insulator cup 40 and the insulator bush 70 are prevented, whereby durability is improved and friction noise is prevented from occurring.

According to a conventional invention, to prevent friction from occurring between the cylinder 10 and the rod valve 30, a bearing is used. However, due to the structure in which the bearing is used, cost and weight are increased. According to an exemplary embodiment of the present invention, the structure having the flow path 200 provided on the rod valve 30 allows friction to be prevented from occurring between the cylinder 10 and the rod valve 30 without an increase in the number of parts, decreasing costs and weights, compared to the structure using the bearing.

Figure 6:
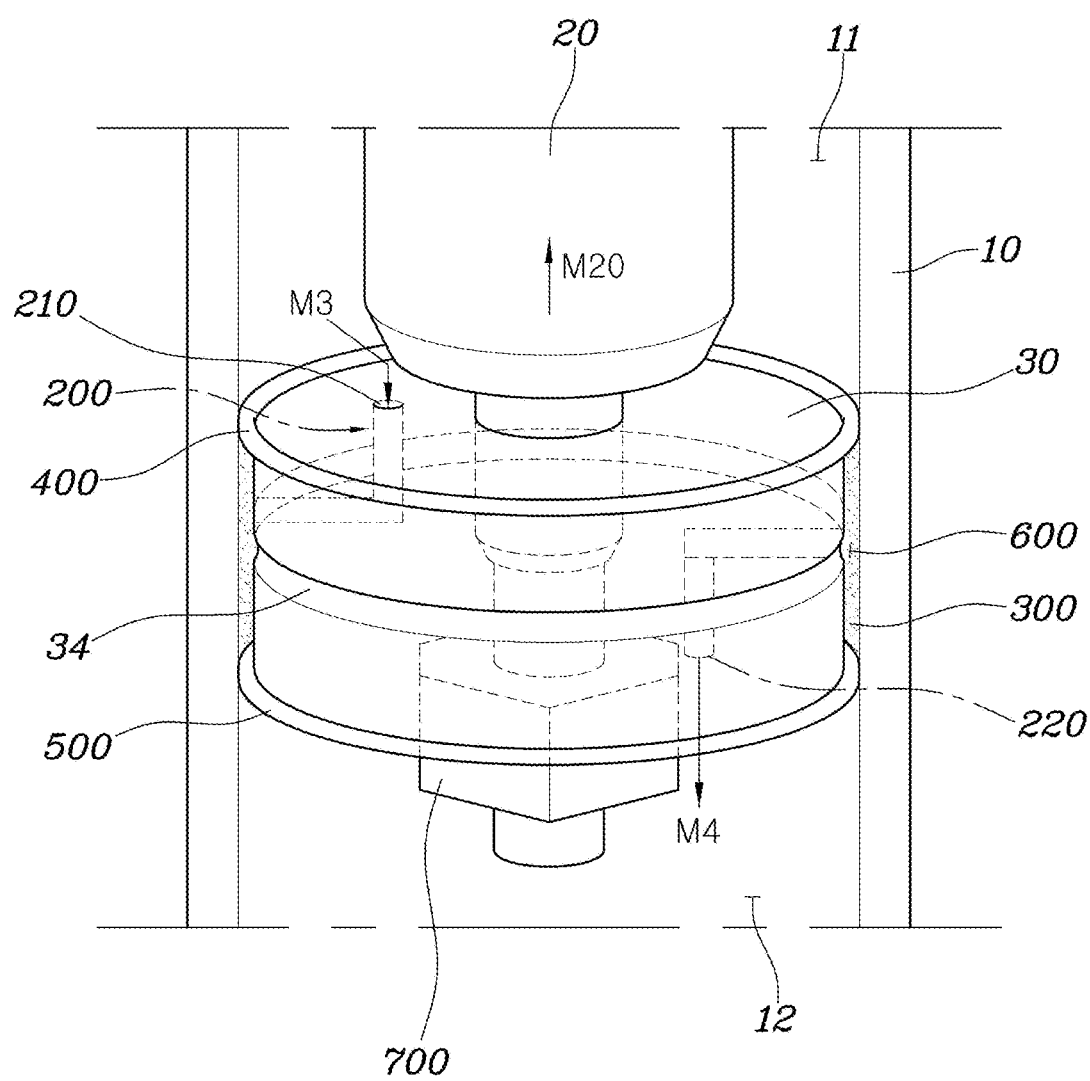

In FIG. 6, a situation occurring during the rebounding is shown, and when the rebounding occurs, the strut rod 20 moves relatively toward the upper side of the cylinder 10 (an arrow M20). In the instant case, the fluid 1 located in the upper chamber 11 of the cylinder 10 is introduced into the first flow path 210 as shown an arrow M3 and is discharged to the fluid space 600, whereby due to the fluid 1 discharged to the fluid space 600, the oil film 300 is formed in the fluid space 600, and friction is prevented from occurring between the cylinder 10 and the rod valve 30 by the oil film 300.

Furthermore, the fluid 1 introduced into the first flow path 210 finally flows through the second flow path 220 to the lower chamber 12 of the cylinder 10, whereby the shock absorber may constantly have a sufficient damping force.

Accordingly, during steering, although the cylinder 10 rotates with the steering knuckle, friction may be prevented from occurring between the cylinder 10 and the rod valve 30 by the oil film 300 formed between the cylinder 10 and the rod valve 30. Accordingly, the rod valve 30 and the strut rod 20 are prevented from rotating with the cylinder 10, whereby the steering responsiveness is improved and the loosening of the strut rod 20 and the relative rotations of the insulator cup 40 and the insulator bush 70 are prevented, so that durability is improved and friction noise is prevented from occurring.

Furthermore, according to the exemplary embodiment of the present invention, a valve groove 34 is provided on the external circumferential surface of the rod valve 30, wherein the valve groove 34 is provided to have a cross section of a concave shape and to be positioned along a circumferential direction of the rod valve and, more particularly, to communicate with the fluid space 600. The valve groove 34 is provided to be connected to the first flow path 210 and the second flow path 220.

When the internal wall surface of the cylinder 10 and an external side surface of the rod valve 30 are in close contact with each other due to a lateral force applied to a vehicle, the fluid space 600 forming a portion of the flow path 200 is sealed and closed. Accordingly, friction occurs between the cylinder 10 and the rod valve 30, and aforementioned conventional problems may occur. Accordingly, to secure efficient flow paths of the fluid 1 even during the occurrence of the lateral force, the present invention has a characteristic of having the fluid space 600 and the valve groove 34, which are provided on the external circumferential surface of the rod valve 30, wherein the valve groove is connected to the first flow path 210 and the second flow path 220.

Furthermore, the valve groove 34 performs regulating a gap between the rod valve 30 and the cylinder 10 and a damping characteristic. That is, when the gap is excessive, malfunction of a piston may occur, and when the gap is insufficient, it is difficult to have a sufficient friction reduction effect. Accordingly, the valve groove 34 is used to set a proper gap between the rod valve 30 and the cylinder 10 and to obtain sufficient flow area, and furthermore, regulates the flow area irrespective to the gap, optimizing the damping characteristic.

As described above, by use of the flow path 200 provided on the rod valve 30, the shock absorber for a vehicle according to an exemplary embodiment of the present invention allows the oil film 300 to be formed between the cylinder 10 and the rod valve 30 during the relative movements of the strut rod 20 and the cylinder 10, and utilizes the oil film to prevent friction from occurring between the cylinder 10 and the rod valve 30 during steering. Accordingly, steering responsiveness is improved and the loosening of the strut rod 20 is prevented, and furthermore, the relative rotations of an insulator cup 40 and an insulator bush 70 are prevented, whereby durability is improved and friction noise is prevented from occurring.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shock absorber apparatus for a vehicle, the shock absorber apparatus comprising:
   a cylinder configured to be connected with a steering knuckle, and filled with fluid in the cylinder;
   a strut rod, an end portion of which is slidably inserted into the cylinder; and
   a rod valve fixedly mounted on the end portion of the strut rod, the rod valve having a flow path guiding a flow of the fluid while the strut rod and the cylinder relatively move to each other,
   wherein the flow path is provided to be fluidically-connected to an external circumferential surface of the rod valve so that an oil film is formed between the external circumferential surface of the rod valve and an internal wall surface of the cylinder while the strut rod and the cylinder relatively move to each other,
   wherein the flow path includes:
      a first flow path formed to pass through an upper surface of the rod valve fixed on the strut rod and fluidically-connected with a fluid space; and
      a second flow path formed to pass through a lower surface of the rod valve fixed on the strut rod and fluidically-connected with the fluid space,
   wherein a valve groove having a cross section of a concave shape is provided on the external circumferential surface of the rod valve along a circumferential direction of the rod valve,
   wherein a first end of the first flow path is positioned on the upper surface of the rod valve and a second end of the first flow path is positioned on a first side surface of the valve groove,
   wherein a first end of the second flow path is positioned on the lower surface of the rod valve and a second end of the second flow path is positioned on a second side surface of the valve groove, and
   wherein the second end of the first flow path and the second end of the second flow path are arranged symmetrical to each other based on a center of a circumference of the rod valve.

2. The shock absorber apparatus of claim 1, further including:
   an upper seal and a lower seal mounted on the external circumferential surface of the rod valve, wherein the upper seal and the lower seal are spaced to each other with the fluid space along a longitudinal axis of the strut rod, and wherein the upper seal and the lower seal are provided to slidably contact the internal wall surface of the cylinder.

3. The shock absorber apparatus of claim 2, wherein a diameter of the rod valve is provided to be smaller than a diameter of the internal wall surface of the cylinder, so that the fluid space is defined between the external circumferential surface of the rod valve, the internal wall surface of the cylinder, the upper seal, and the lower seal, and wherein the fluid space fluidically-communicates with the flow path to form the oil film.

4. The shock absorber apparatus of claim 3, wherein diameters of the upper seal and the lower seal are greater than the diameter of the rod valve and substantially equal to the diameter of the internal wall surface of the cylinder to form the fluid space so that the upper seal and the lower seal are slidably engaged to the internal wall surface of the cylinder.

5. The shock absorber apparatus of claim 4, wherein while the strut rod and the cylinder relatively move to each other, the fluid communicates with the fluid space to form the oil film in the fluid space.

6. The shock absorber apparatus of claim 4, wherein the cylinder includes an upper chamber and a lower chamber, wherein the upper chamber is positioned above the upper seal and fluidically-connected to the first flow path, and wherein the lower chamber is positioned below the lower seal and fluidically-connected to the second flow path.

7. The shock absorber apparatus of claim 6, wherein when the strut rod moves relatively toward a lower side of the cylinder, a fluid located in the lower chamber is introduced into the second flow path and discharged to the fluid space to have the oil film formed in the fluid space, and then flows through the first flow path to the upper chamber.

8. The shock absorber apparatus of claim 4, wherein the valve groove is positioned between the upper seal and the lower seal along the longitudinal axis of the strut rod.

9. A shock absorber apparatus for a vehicle, the shock absorber apparatus comprising:

a rod valve fixedly mounted on an end portion of a strut rod slidably mounted in a cylinder; and a flow path provided on the rod valve, through which fluid flows, wherein the flow path is provided in an upper surface, an external circumferential surface, and a lower surface of the rod valve to form an oil film in a fluid space between an inner wall surface of the cylinder and the external circumferential surface of the rod valve by a fluid discharged to the external circumferential surface of the rod valve, wherein the flow path includes:

a first flow path formed to pass through an upper surface of the rod valve fixed on the strut rod, and fluidically-connected with the fluid space; and a second flow path formed to pass through a lower surface of the rod valve fixed on the strut rod, and fluidically-connected with the fluid space, wherein a valve groove having a cross section of a concave shape is provided on the external circumferential surface of the rod valve along a circumferential direction of the rod valve, wherein a first end of the first flow path is positioned on the upper surface of the rod valve and a second end of the first flow path is positioned on a first side surface of the valve groove, wherein a first end of the second flow path is positioned on the lower surface of the rod valve and a second end of the second flow path is positioned on a second side surface of the valve groove, and wherein the second end of the first flow path and the second end of the second flow path are arranged symmetrical to each other based on a center of a circumference of the rod valve.

10. The shock absorber apparatus of claim 9, wherein the fluid is discharged through the flow path to the external circumferential surface of the rod valve while the strut rod and the cylinder relatively move to each other.

11. The shock absorber apparatus of claim 9, wherein the flow path is fluidically-connected to a first cylinder space positioned on an upper side of the rod valve and with a second cylinder space positioned on a lower side of the rod valve.

12. The shock absorber apparatus of claim 9, further including:

an upper seal and a lower seal mounted on the external circumferential surface of the rod valve and slidably contacting the internal wall surface of the cylinder, wherein the upper seal and the lower seal are spaced to each other along a longitudinal axis of the strut rod and the external circumferential surface of the rod valve and the internal wall surface of the cylinder are spaced to each other, to form the fluid space between the upper seal, the lower seal, the external circumferential surface of the rod valve and the internal wall surface of the cylinder.

* * * * *